(12) United States Patent
Okuda et al.

(10) Patent No.: US 6,630,551 B1
(45) Date of Patent: Oct. 7, 2003

(54) CATALYST FOR OLEFIN POLYMERIZATION AND PROCESS FOR PRODUCING OLEFIN POLYMER WITH THE CATALYST

(75) Inventors: Fumio Okuda, Ichihara (JP); Haruhito Sato, Ichihara (JP); Masahiko Kuramoto, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/600,164

(22) PCT Filed: Dec. 2, 1999

(86) PCT No.: PCT/JP99/06767
§ 371 (c)(1),
(2), (4) Date: Aug. 2, 2000

(87) PCT Pub. No.: WO00/32642
PCT Pub. Date: Jun. 8, 2000

(30) Foreign Application Priority Data

Dec. 2, 1998 (JP) ............................................. 10-342457
Dec. 2, 1998 (JP) ............................................. 10-342459

(51) Int. Cl.[7] .................................................. C08F 4/42
(52) U.S. Cl. ........................ 526/161; 526/171; 526/172; 526/120; 526/141; 526/348; 502/155; 502/167
(58) Field of Search ................................. 526/161, 171, 526/172, 120, 141, 348; 502/155, 167

(56) References Cited

FOREIGN PATENT DOCUMENTS

| EP | 0 511 665 | * | 11/1992 |
|---|---|---|---|
| EP | 1 106 249 A1 | | 6/2001 |
| JP | 2000-1513 | * | 1/2000 |
| WO | WO 97/48736 | * | 12/1997 |
| WO | WO 98/27124 | * | 6/1998 |
| WO | WO 98/30612 | * | 7/1998 |
| WO | WO 99/48605 | | 9/1999 |
| WO | WO 99/48930 | * | 9/1999 |
| WO | WO 00/20467 | | 4/2000 |

* cited by examiner

Primary Examiner—David W. Wu
Assistant Examiner—Ling Siu Choi
(74) Attorney, Agent, or Firm—Oblon, Spivak, McClelland, Maier & Neustadt, P.C.

(57) ABSTRACT

A catalyst which comprises a compound of a transition metal in Groups 8 to 10 of the Periodic Table having a nitrogenous tridentate ligand, a clay, clay minteral, or lamellar ion-exchanging compound, an organosilane compound, and organoaluminum compound, etc.; and a process for producing a polyolefin with the catalyst. The catalyst is highly active, does not adhere to reactor walls, and can give a polyolefin excellent in powder morphology. Consequently, a polyolefin (especially polyethylene) can be industrially advantageously produced.

15 Claims, No Drawings

CATALYST FOR OLEFIN POLYMERIZATION AND PROCESS FOR PRODUCING OLEFIN POLYMER WITH THE CATALYST

TECHNICAL FIELD

The present invention relates to catalysts for olefin polymerization and to a method of using the catalysts for producing.olefin polymers. More precisely, the invention relates to catalysts for olefin polymerization, with which polyolefins, especially polyethylenes are efficiently produced on an industrial scale, and relates to a method of using the catalysts for producing olefin polymers.

BACKGROUND ART

At present, Ziegler catalysts and metallocene catalysts are much used for olefin polymerization, and they comprise, as the essential catalyst component, a compound of a metal element belonging to Group 4 of the Periodic Table, such as titanium, zirconium, etc.

On the other hand, recently, novel catalyst systems that differ from the above have been developed, and they comprise a complex of a metal belonging to Groups 8 to 10 of the Periodic Table, such as typically nickel or palladium. Heretofore, nickel complexes have been known as oligomerization catalysts for olefins, but it has been said that they are unsuitable to polymer production.

Regarding the catalyst systems comprising such a nickel or palladium complex, some techniques have been proposed, including, for example, (1) a method of using a catalyst with an Ni(0) complex coordinated with an adduct of quinone and a tertiary phosphine for ethylene polymerization (Japanese Patent Publication No. 1796/1993); (2) a catalyst system comprising an Ni(0) complex, an adduct of maleic anhydride and a tertiary phosphine, a phosphorylide, and an organoaluminium compound (Japanese Patent Laid-Open No. 203106/1986); (3) a catalyst system comprising an Ni(0) or Ni(II) complex and an iminophospholane compound (Japanese Patent Laid-Open No. 115311/1991); (4) a method of using a borate complex of a metal of Groups 8 to 10 (Fe, Co, Ni, Ru, Rh, Pd, Os, Ir, Pt) coordinated with a cis-type chelate ligand for ethylene polymerization (Japanese Patent Laid-Open No. 227608/1992); (5) a catalyst system comprising an Ni(0) complex, an adduct of an imide and a tertiary phosphine, and a phosphine oxide (Japanese Patent Laid-Open No. 122721/1994); (6) a catalyst system comprising a combination of a Pd(II):$BF_4^-$ complex and methylaluminoxane (Japanese Patent Laid-Open No. 82314/1995); (7) a catalyst system comprising an Ni(II) complex, an iminophospholane compound and an organoaluminium compound (Japanese Patent Laid-Open No. 277610/1991); (8) a catalyst system comprising an Ni(0) or Ni(II) complex and an iminophospholane compound having a bulky substituent (Japanese Patent Laid-Open No. 25932/1995); (9) a catalyst system comprising a combination of an Ni(II):phosphorus:oxygen chelate complex and a linear or cyclic aluminium compound (Japanese Patent Laid-Open No. 14217/1989), etc.

However, the ethylene polymerization method (1) is defective in that it requires an extremely high reaction pressure (for example, 100 kg/cm$^2$) and the catalyst activity to give polyethylene therein is extremely low (about 6 kg/g-Ni·hr). The catalyst system (2) is also defective in that it is for high-pressure ethylene reaction and it is complicated as comprising many different components. In addition, its activity is extremely low (about 1 kg/g-Ni·hr or less). The catalyst system (3) could be effective even under low reaction pressure, but its activity is extremely low (about 1 kg/g-Ni·hr or less). In the ethylene polymerization method (4), the catalyst activity is extremely low (about 0.1 kg/g-Ni·hr or less). The activity of the catalyst system (5) is low (about 5 kg/g-Ni·hr). Though comprising a cationic complex, the catalyst system (6) requires expensive methylaluminoxane for expressing its activity. In addition, its activity is low (about 3 kg/g-Ni·hr or less). The activity of the catalyst systems (7) and (8) is extremely low (about 5 kg/g-Ni·hr or less). The catalyst system (9) contains a linear or cyclic organoaluminoxane that serves as a promoter. However, the organoaluminoxane is produced through reaction of a trialkylaluminium or dialkylaluminium monochloride with water, and only methylaluminoxane is described in the examples. No description relating to a low-molecular-weight linear or cyclic organoaluminiumoxy compound is given in the specification. In addition, the system requires expensive methylaluminoxane. Still another drawback of the system is that it requires high reaction pressure, correlating to its activity, but its activity is low (for example, about 20 kg/g-Ni·hr or less under a reaction pressure of 30 kg/cm$^2$G).

Recently, a catalyst system that comprises a combination of a complex of a metal of Groups 8 to 10, typically such as nickel or palladium, coordinated with a nitrogen-containing ligand such as a diimine or the like, and an organoaluminium compound such as methylaluminoxane (MAO) or the like, or comprises the nitrogen-containing ligand complex combined with an anion species of $BF_4^-$, $PF_6^-$, $SbF_6^-$ or $BAF^-$ [tetrakis(3,5-bistrifluoromethylphenyl)borate] has been disclosed (International Patent Laid-Open No. 96/23010). For example, disclosed is a catalyst system comprising a compound of a formula [1]:

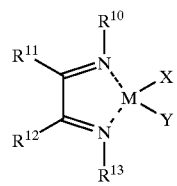

[1]

wherein $R^{10}$ and $R^{13}$ each independently represent an aliphatic hydrocarbon group having from 1 to 20 carbon atoms, or an aromatic group having from 7 to 20 carbon atoms in total and having a hydrocarbon group on its ring; $R^{11}$ and $R^{12}$ each independently represent a hydrogen atom, or a hydrocarbon group having from 1 to 20 carbon atoms; $R^{11}$ and $R^{12}$ may be bonded to each other to form a ring; X and Y each independently represent a hydrogen atom, or a hydrocarbon group having from 1 to 20 carbon atoms; M represents a transition metal of Groups 8 to 10 of the Periodic Table.

The catalyst system has the advantage of extremely high activity in ethylene polymerization, as compared with the catalyst systems mentioned above, but can be used only at low temperatures. In addition, the molecular weight of the polymers produced with it is low. Therefore, the catalyst system is not as yet practicable.

Further recently, a catalyst system comprising a nitrogen-containing tridentate ligand complex with iron or cobalt has been disclosed (Brookhart et al., J. Am. Chem. Soc., 1998, 4049; Gibson et al., Chem. Commun., 1998, 849). For example, it includes a compound of a formula [2]:

[2]

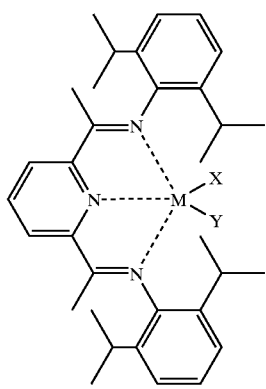

wherein X and Y each independently represent a hydrogen atom, a halogen atom, or a hydrocarbon group having from 1 to 20 carbon atoms; M represents a transition metal of Groups 8 to 10 of the Periodic Table.

The catalyst system has the advantage of extremely high activity in ethylene polymerization (about 400 kg/g-Ni·hr), as compared with the conventional Group 8 to 10 transition metal catalysts:mentioned above. However, in order to fully express its activity, it requires a large amount of an alumininoxane, especially methylaluminoxane. Methylaluminoxane is expensive, and, in addition, it is difficult to handle, its storage stability is poor, and it is extremely dangerous. Aluminoxanes must be produced through reaction of a trialkylaluminium or dialkylaluminium monochloride with water, and the reaction efficiency for producing them is low. In addition, the catalyst residue must be removed from the polymers produced. Furthermore, still another problem with the polymerization method of using such an aluminoxane is that the polymers produced often adhere to reactor walls and will be a bar to safe driving of production equipment.

On the other hand, a method of olefin polymerization with a catalyst that comprises one or both of the above-mentioned transition metal compound and aluminoxane carried on an inorganic oxide such as silica, alumina or the like, has been proposed (Japanese Patent Laid-Open Nos. 108610/1986, 135408/1985, 296008/1986, 74412/1991, 74415/1991, 272713/1997, etc.). Also proposed is a method of olefin polymerization with a catalyst that comprises one or both of the transition metal compound and the organoaluminium compound carried on an inorganic oxide such as silica, alumina or the like, or on an organic substance (Japanese Patent Laid-Open Nos. 101303/1989, 207303/1989, 234709/1991, 234710/1991, International Patent Publication No. 501869/1991, etc.). Still proposed is a method of using clay minerals for the catalyst component (Japanese Patent Laid-Open No. 301917/1993, etc.). However, for pretreatment of clay minerals, organoaluminium compounds are indispensable. Further, expensive and dangerous trimethylaluminium only is exemplified as the preferred agent for the treatment. Moreover, all the proposed methods are still defective in that the catalyst activity per aluminium therein is low and the products contain a large amount of catalyst residues. Still another drawback of the methods is that the polymers produced are amorphous and their powder morphology is not good.

The present invention relates to catalysts for olefin polymerization and to a method of using the catalysts for producing olefin polymers. More precisely, its object is to provide catalysts for olefin polymerization and a method of using the catalysts for producing olefin polymers, of which the advantages are that the catalysts do not require methylaluminoxane to be derived from expensive trialkylaluminiums, removing catalyst residues from the polymers produced is unnecessary, the amount of the organoaluminium compound to be used is greatly reduced, and olefin polymers, especially polyethylenes are efficiently produced on an industrial scale.

DISCLOSURE OF THE INVENTION

We, the present inventors have assiduously studied so as to attain the object as above, and, as a result, have found that the object can be attained by polymerizing olefins, especially ethylene, in the presence of a catalyst which comprises a transition metal compound of Groups 8 to 10 of the Periodic Table having a specific structure, any of clay, a clay mineral or an ion-exchanging layered compound, and an organosilane compound. On the basis of this finding, we have completed the present invention.

Specifically, the invention includes the first and second aspects as in the following description, both providing catalysts for olefin polymerization and a method of using the catalysts for producing olefin polymers.

[First Aspect of the Invention]

1. A catalyst for olefin polymerization, comprising (A) a transition metal compound of the following general formula (I-I), which has a nitrogen-containing tridentate ligand and of which the transition metal is of Groups 8 to 10 of the Periodic Table, (B) clay, a clay mineral or an ion-exchanging layered compound, (C) an organosilane compound, (D) an organoaluminium compound and/or (E) an alkylating agent:

(I-1)

wherein M represents a transition metal of Groups 8 to 10 of the Periodic Table; $R^1$, $R^2$, $R^3$ and $R^4$ each independently represent a hydrogen atom, a hydrocarbon group having from 1 to 20 carbon atoms, or a cycloaromatic hydrocarbon group having from 7 to 20 carbon atoms in total; X represents a halogen atom; Y represents a hydrogen atom, a halogen atom, or a hydrocarbon group having from 1 to 20 carbon atoms; Z represents a nitrogen-containing functional group.

2. The catalyst for olefin polymerization of above 1, in which Z in formula (I-I) is represented by the following general formula (I-II):

(I-II)

wherein $R^5$ and $R^6$ each independently represent an aliphatic hydrocarbon group having from 1 to 20 carbon atoms, or a cycloaromatic hydrocarbon group having from 7 to 20 carbon atoms in total; n represents 0 or a natural number.

3. The catalyst for olefin polymerization of above 1, in which Z in formula (I-I) is represented by the following general formula (I-III):

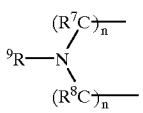
(I-III)

wherein $R^7$, $R^8$ and $R^9$ each independently represent an aliphatic hydrocarbon group having from 1 to 20 carbon atoms, or a cycloaromatic hydrocarbon group having from 7 to 20 carbon atoms in total, and these may be bonded to each other to form a ring; n represents 0 or a natural number.

4. The catalyst for olefin polymerization of any of above 1 to 3, in which the transition metal of Groups 8 to 10 of the Periodic Table is iron or cobalt.
5. The catalyst for olefin polymerization of any of above 1 to 4, in which (B) is a phyllosilicate.
6. The catalyst for olefin polymerization of any of above 1 to 4, in which (B) is montmorillonite.
7. The catalyst for olefin polymerization of any of above 1 to 6, in which (C) is an organosilane compound having at least one alkyl group directly bonded to the silicon atom.
8. The catalyst for olefin polymerization of any of above 1 to 7, in which (E) is a trialkylaluminium compound.
9. A method for producing olefin polymers, which comprises polymerizing olefins in the presence of the catalyst for olefin polymerization of any of above 1 to 8.
10. The method for producing olefin polymers of above 9, in which the olefin is ethylene.

[Second Aspect of the Invention]

1. A catalyst for olefin polymerization, comprising (A) a transition metal compound which has a nitrogen-containing tridentate ligand and of which the transition metal is of Groups 8 to 10 of the Periodic Table, (B) clay, a clay mineral or an ion-exchanging layered compound and (C) an organosilane compound.
2. The catalyst for olefin polymerization of above 1, in which the transition metal compound (A) is represented by the following general formula (II-I)

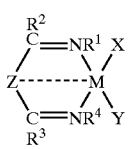
(II-I)

wherein M represents a transition metal of Groups 8 to 10 of the Periodic Table; $R^1$, $R^2$, $R^3$ and $R^4$ each independently represent a hydrogen atom, a hydrocarbon group having from 1 to 20 carbon atoms, or a cycloaromatic hydrocarbon group having from 7 to 20 carbon atoms in total; X and Y each independently represent a hydrogen atom, or a hydrocarbon group having from 1 to 20 carbon atoms; Z represents a nitrogen-containing functional group.

3. The catalyst for olefin polymerization of above 2, in which Z in formula (II-I) is represented by the following general formula (II-II):

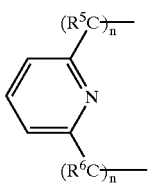
(II-II)

wherein $R^5$ and $R^6$ each independently represent an aliphatic hydrocarbon group having from 1 to 20 carbon atoms, or a cycloaromatic hydrocarbon group having from 7 to 20 carbon atoms in total; n represents 0 or a natural number.

4. The catalyst for olefin polymerization of above 2, in which Z in formula (II-I) is represented by the following general formula (II-III):

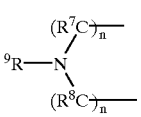
(II-III)

wherein $R^7$, $R^8$ and $R^9$ each independently represent an aliphatic hydrocarbon group having from 1 to 20 carbon atoms, or a cycloaromatic hydrocarbon group having from 7 to 20 carbon atoms in total, and these may be bonded to each other to form a ring; n represents 0 or a natural number.

5. The catalyst for olefin polymerization of any of above 1 to 4, in which the transition metal of Groups 8 to 10 of the Periodic Table is iron or cobalt.
6. The catalyst for olefin polymerization of any of above 1 to 5, in which (B) is a phyllosilicate.
7. The catalyst for olefin polymerization of any of above 1 to 5, in which (B) is montmorillonite.
8. A method for producing olefin polymers, which comprises polymerizing olefins in the presence of the catalyst for olefin polymerization of any of above 1 to 7.
9. The method for producing olefin polymers of above 8, in which the olefin is ethylene.

BEST MODES OF CARRYING OUT THE INVENTION

The first and second aspects of the invention are described below with reference to their embodiments.

[First Aspect of the Invention]

As so mentioned above, the catalyst for olefin polymerization of the first aspect of the invention (in this section, the first aspect of the invention will be simply referred to as "the invention") comprises (A) a transition metal compound of the above-mentioned formula (I), which has a nitrogen-containing tridentate ligand and of which the transition metal is of Groups 8 to 10 of the Periodic Table, (B) clay, a clay mineral or an ion-exchanging layered compound, (C) an organosilane compound, (D) an organoaluminium compound and/or (E) an alkylating agent. In the method for producing olefin polymers of the invention, the olefin polymerization catalyst is used for polymerizing olefins.

The catalyst for olefin polymerization and the method for producing olefin polymers of the first aspect of the invention are described in detail hereinunder.

[1] Catalyst for Olefin Polymerization (1) Transition Metal Compound (A)

The transition metal compound (A) for use in the invention, which has a nitrogen-containing tridentate ligand and of which the transition metal is of Groups 8 to 10 of the Periodic Table, is represented by the following general formula (I-I):

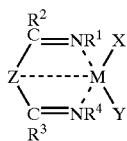
(I-1)

wherein M represents a transition metal of Groups 8 to 10 of the Periodic Table; $R^1$, $R^2$, $R^3$ and $R^4$ each independently represent a hydrogen atom, a hydrocarbon group having from 1 to 20 carbon atoms, or a cycloaromatic hydrocarbon group having from 7 to 20 carbon atoms in total; X represents a halogen atom; Y represents a hydrogen atom, a halogen atom, or a hydrocarbon group having from 1 to 20 carbon atoms; Z represents a nitrogen-containing functional group.

M represents a transition metal of Groups 8 to 10 of the Periodic Table, concretely including Fe, Co, Ni, Ru, Rh, Pd, Os, Ir and Pt. Of these, preferred is Fe or Co.

$R^1$, $R^2$, $R^3$ and $R^4$ each independently represent a hydrogen atom, a hydrocarbon group having from 1 to 20 carbon atoms, or a cycloaromatic hydrocarbon group having from 7 to 20 carbon atoms in total. The hydrocarbon group having from 1 to 20 carbon atoms includes a linear hydrocarbon group having from 1 to 20 carbon atoms, a branched hydrocarbon group having from 3 to 20 carbon atoms, and a cycloaliphatic hydrocarbon group having from 3 to 20 carbon atoms. Concretely, it includes a methyl group, an ethyl group, an n-propyl group, an isopropyl group, an n-butyl group, an isobutyl group, a sec-butyl group, a t-butyl group, a pentyl group, a hexyl group, an octyl group, a decyl group, a tetradecyl group, a hexadecyl group, an octadecyl group, a cyclopentyl group, a cyclohexyl group, a cyclooctyl group, etc.

X represents a halogen atom, and Y represents a hydrogen atom, a halogen atom, or a hydrocarbon group having from 1 to 20 carbon atoms. The hydrocarbon group having from 1 to 20 carbon atoms may be the same as that mentioned above. The halogen atom includes a chlorine atom, a bromine atom, a fluorine atom, and an iodine atom, and is preferably a chlorine atom. For the hydrocarbon group having from 1 to 20 carbon atoms, preferred is a methyl group.

Z is a nitrogen-containing functional group. Preferably, it is represented by the following general formula (I-II):

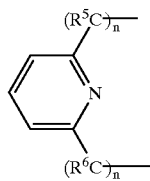
(I-II)

wherein $R^5$ and $R^6$ each independently represent an aliphatic hydrocarbon group having from 1 to 20 carbon atoms, or a cycloaromatic hydrocarbon group having from 7 to 20 carbon atoms in total; n represents 0 or a natural number.

The aliphatic hydrocarbon group having from 1 to 20 carbon atoms and the cycloaromatic hydrocarbon group having from 7 to 20 carbon atoms in total for $R^5$ and $R^6$ may be the same as the hydrocarbon group having from 1 to 20 carbon atoms and the cycloaromatic hydrocarbon group having from 7 to 20 carbon atoms in total mentioned hereinabove for $R^1$, $R^2$, $R^3$ and $R^4$. n indicates 0 or a natural number, but is preferably any of 0, 1, 2 or 3.

Specific examples of the nitrogen-containing compounds of formula (I-II) are

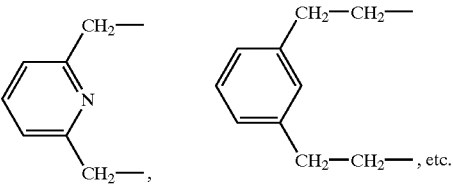

For Z, also preferred is a nitrogen-containing functional group of the following general formula (I-III):

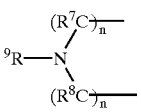
(I-III)

wherein $R^7$, $R^8$ and $R^9$ each independently represent an aliphatic hydrocarbon group having from 1 to 20 carbon atoms, or a cycloaromatic hydrocarbon group having from 7 to 20 carbon atoms in total, and these may be bonded to each other to form a ring; n represents 0 or a natural number.

The aliphatic hydrocarbon group having from 1 to 20 carbon atoms and the cycloaromatic hydrocarbon group having from 7 to 20 carbon atoms in total for $R^7$, $R^8$ and $R^9$ may be the same as the hydrocarbon group having from 1 to 20 carbon atoms and the cycloaromatic hydrocarbon group having from 7 to 20 carbon atoms in total mentioned hereinabove for $R^1$, $R^2$, $R^3$ and $R^4$. $R^7$, $R^8$ and $R^9$ may be bonded to each other to form a ring. The ring is not specifically defined, including, for example, a cyclohexyl skeleton, a cyclopentyl skeleton, etc. n indicates 0 or a natural number, but is preferably any of 0, 1, 2 or 3.

Specific examples of the nitrogen-containing compounds of formula (I-III) are

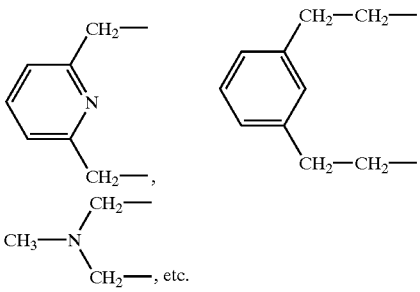

For Z, especially preferred is the nitrogen-containing functional group of formula (I-II) having a pyridine skeleton.

One preferred embodiment of the transition metal compound of formula (I-I) is represented by the following general formula (I-IV):

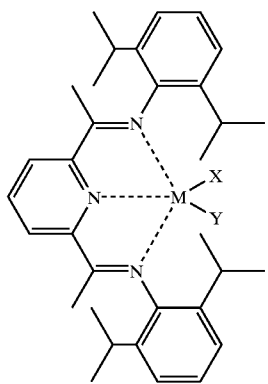
(I-IV)
wherein M represents Fe or Co; X represents a halogen atom; Y represents a hydrogen atom, a halogen atom, or a hydrocarbon group having from 1 to 20 carbon atoms.
Specific examples of the transition metal compound of that type are the following compounds [3] to [15].
[3]
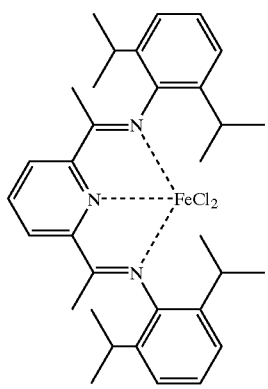
[4]
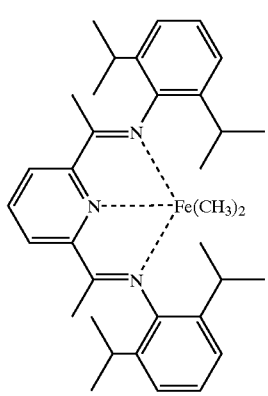
[5]
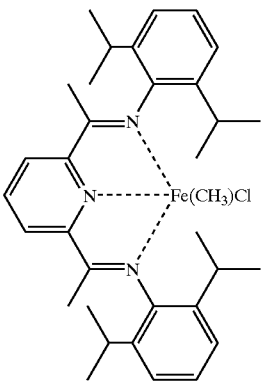
[6]
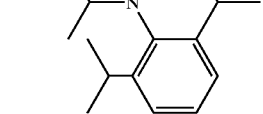
[7]
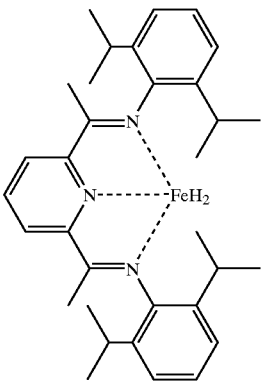
[8]
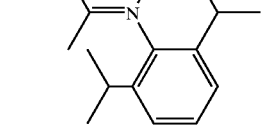

-continued

[9]
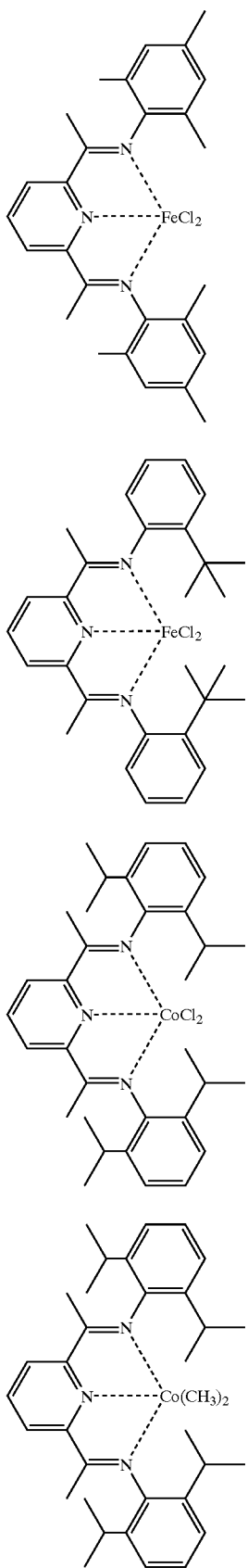

[10]

[11]

[12]

-continued

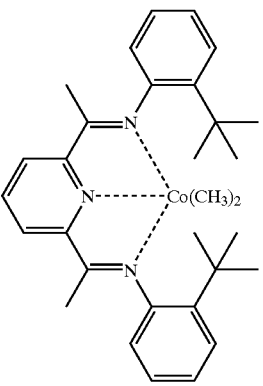
[13]

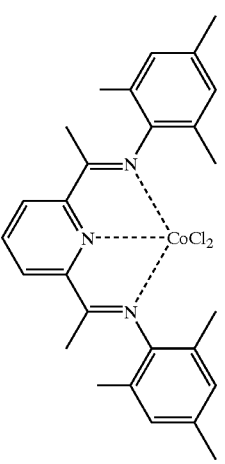
[14]

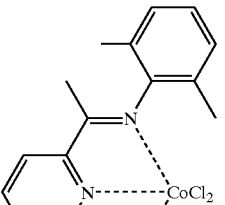
[15]

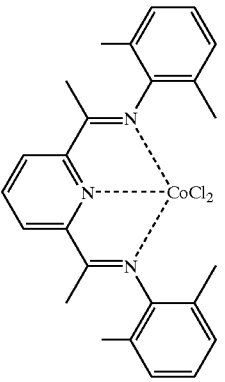

In the invention, one or more of the transition metal compounds mentioned above may be used, either singly or as combined, for the component (A).

(B) Clay, Clay Mineral or Ion-exchanging Layered Compound

For the component (B), used is any of clay, clay minerals or ion-exchanging layered compounds.

Clay is an aggregate of fine hydrous silicate minerals. It is plastic when kneaded with a suitable amount of water, and is rigid when dried. When baked at high temperatures, it is sintered. Clay minerals are hydrous silicates which are the essential components constituting clay.

These are not limited to only natural ones, but synthetic products of those substances are employable herein.

Ion-exchanging layered compounds are characterized by their crystal structure of such that a plurality of crystal planes formed through ionic bonding or the like are laminated in parallel layers via weak bonding force between the adjacent layers, in which the ions are exchangeable. Some clay minerals are ion-exchanging layered compounds.

For example, phyllosilicic acid compounds belong to clay minerals. Phyllosilicic acid compounds include phyllosilicic acid and phyllosilicates. As natural phyllosilicates, known are montmorillonite, saponite and hectorite of the smectite family; illite and sericite of the mica family; and mixed layer minerals of smectites and micas, or those of micas and vermiculites.

As synthetic products, known are fluoro-tetrasilicon mica, laponite, smectone, etc.

Also mentioned are ionic crystalline compounds having a layered crystal structure, such as $\alpha$-Zr $(HPO_4)_2$, $\gamma$-Zr $(HPO_4)_2$, $\alpha$-Ti$(HPO_4)_2$, $\gamma$-Ti$(HPO_4)_2$, etc. These are not clay minerals.

Examples of clay and clay minerals which do not belong to ion-exchanging layered compounds and which are usable for the component (B) include clay having a low montmorillonite content and referred to as bentonite; kibushi clay comprising montmorillonite and many other components; gairome clay; sepiolite and palygorskite having a fibrous morphology; and amorphous or low-crystalline allophane, imogolite, etc.

In the invention, the component (B) is contacted with the components (A) and (C), and it is desirable that clay, clay minerals and ion-exchanging layered compounds for the component (B) are chemically treated for the purpose of removing impurities from them or for modifying their structures and functions.

The chemical treatment referred to herein indicates both the surface treatment to remove impurities from surfaces and the treatment to modify the crystal structure of clay. Concretely, it includes acid treatment, alkali treatment, salt treatment, organic treatment, etc.

The acid treatment is to remove impurities from surfaces, while releasing cations such as aluminium, iron, magnesium and the like from crystal structures to thereby enlarge surface areas. The alkali treatment is to destroy the crystal structure of clay, thereby modifying the structure of clay. The salt treatment and the organic treatment are to form ionic complexes, molecular complexes, organic complexes, etc., whereby surface areas and layer-to-layer spaces may be changed. Owing to their ion-exchanging ability, the interlayer exchangeable ions in the compounds may be exchanged with any other bulky ions to give layered substances having enlarged interlayer spaces.

The substances for the component (B) noted above may be directly used as they are, or, if desired, additional water may be adsorbed onto them, or they may be heated and dehydrated prior to being used.

For the component (B), preferred are clay and clay minerals. Most preferred are phyllosilicic acid compounds, of which smectite is desirable, and montmorillonite is more desirable.

(C) Organosilane Compound

Organosilane compounds for the component (C) in the invention include, for example, trialkylsilyl chlorides such as trimethylsilyl chloride, triethylsilyl chloride, triisopropylsilyl chloride, tert-butyldimethylsilyl chloride, tert-butyldiphenylsilyl chloride, phenethyldimethylsilyl chloride, etc.; dialkylsilyl dichlorides such as dimethylsilyl dichloride, diethylsilyl dichloride, diisopropylsilyl dichloride, bisdiphenethylsilyl dichloride, methylphenethylsilyl dichloride, diphenylsilyl dichloride, dimethylsilyl dichloride, ditolylsilyl dichloride, etc.; alkylsilyl trichlorides such as methylsilyl trichloride, ethylsilyl trichloride, isopropylsilyl trichloride, phenylsilyl trichloride, mesitylsilyl trichloride, tolylsilyl trichloride, phenethylsilyl trichloride, etc.; other halides to be derived from the compounds noted above by substituting the chloride moiety with any other halogens; silylamines such as bis(trimethylsilyl)amine, bis(triethylsilyl)amine, bis(triisopropylsilyl)amine, bis(dimethylethylsilyl) amine, bis(diethylmethylsilyl) amine, bis(dimethylphenylsilyl)amine, bis(dimethyltolylsilyl)amine, bis(dimethylmesitylsilyl)amine, N,N-dimethylaminotrimethylsilane, (diethylamino)trimethylsilane, N-(trimethylsilyl)imidazole, etc.; polysilanols generally referred to as peralkylpolysiloxypolyols; silanols such as tris(trimethylsiloxy)silanol, etc.; silylamides such as N,O-bis(trimethylsilyl)acetamide, bis(trimethylsilyl)trifluoroacetamide, N-(trimethylsilyl) acetamide, bis(trimethylsilyl)urea, trimethylsilyldiphenylurea, etc.; linear siloxanes such as 1,3-dichlorotetramethyldisiloxane, etc.; cyclic siloxanes such as pentamethylcyclopentanesiloxane, etc.; tetraalkylsilanes such as dimethyldiphenylsilane, diethyldiphenylsilane, diisopropyldiphenylsilane, etc.; and trialkylsilanes such as trimethylsilane, triethylsilane, triisopropylsilane, tri-t-butylsilane, triphenylsilane, tritolylsilane, trimesitylsilane, methyldiphenylsilane, dinaphthylmethylsilane, bis(diphenyl)methylsilane, etc. Of those, preferred are organosilane compounds having at least one alkyl group directly bonded to the silicon atom. More preferred are alkylsilyl halides, and even more preferred are dialkylsilyl halides. One of those compounds may be used for the component (C). As the case may be, however, two or more of the compounds may be used, as combined in any desired manner.

(D) Organoaluminium Compound

In the invention, (D) an organoaluminium compound and/or (E) an alkylating agent are/is used.

Organoaluminium compounds for the component (D) are not specifically defined. For example, preferred are alkyl group-having aluminium compounds of the following general formula (I-V):

$$R^{14}{}_p Al(OR^{15})_q L_{3-p-q} \qquad (I\text{-}V)$$

wherein $R^{14}$ and $R^{15}$ each represent a hydrogen atom, or a hydrocarbon group having from 1 to 20, preferably from 1 to 4 carbon atoms; L represents a halogen atom; $0<p\leq 3$, preferably p=2 or 3, most preferably p=3; $0\leq q<3$, preferably q=0 or 1.

Examples of the compounds are trialkylaluminiums such as trimethylaluminium, triethylaluminium, tripropylaluminium, triisobutylaluminium, tri-t-butylaluminium, etc.; halogen-, alkoxy- or hydroxyl-having alkylaluminiums such as dimethylaluminium chloride, diethylaluminium chloride, dimethylaluminium methoxide, diethylaluminium methoxide, dimethylaluminium hydroxide, diethylaluminium hydroxide, etc.; hydrogen-having alkylaluminiums such as dimethylaluminium hydride, diisobutylaluminium hydride, etc. Of those, preferred are trialkylaluminiums, and more preferred are trimethylaluminium and triisobutylaluminium. One or more of the organoaluminium compounds mentioned above may be used herein either singly or as combined.

(E) Alkylating Agent

In the invention, optionally used is an alkylating agent for the component (E). Various types of alkylating agents are usable herein. For example, they include alkyl group-having aluminium compounds of the above-mentioned general formula (I-V), alkyl group-having magnesium compounds of the following general formula (I-VI), and alkyl group-having zinc compounds of the following general formula (I-VII):

$$R^{16}{}_2Mg \qquad \text{(I-VI)}$$

wherein $R^{16}$'s each represent a hydrocarbon group having from 1 to 20, preferably from 1 to 3 carbon atoms, and they may be the same or different, $$R^{16}{}_2Zn \qquad \text{(I-VII)}$$

wherein $R^{16}$ has the same meaning as above.

Of these alkyl group-having compounds, preferred are alkyl group-having aluminium compounds, and more preferred are trialkylaluminiums and dialkylaluminiums. Concretely, they include trialkylaluminiums such as trimethylaluminium, triethylaluminium, tri-n-propylaluminium, tri-n-butylaluminium, triisobutylaluminium, tri-t-butylaluminium, etc.; dialkylaluminium halides such as dimethylaluminium chloride, diethylaluminium chloride, di-n-butylaluminium chloride, diisobutylaluminium chloride, di-t-butylaluminium chloride, etc.; dialkylaluminium alkoxides such as dimethylaluminium methoxide, dimethylaluminium ethoxide, etc.; dialkylaluminium hydrides such as dimethylaluminium hydride, diethylaluminium hydride, diisobutylaluminium hydride, etc. They further include dialkylmagnesiums such as dimethylmagnesium, diethylmagnesium, di-n-propylmagnesium, diisopropylmagnesium, dibutylmagnesium, etc.; and dialkylzincs such as dimethylzinc, diethylzinc, ethyl-n-propylzinc, diisopropylzinc, etc. Of these, alkyl group-having aluminium compounds of formula (I-V) are preferred for the component (E). More preferred are trialkylaluminiums.

In the invention, one or more of the compounds mentioned above may be used, either singly or as combined, for the component (E).

The ratio of the components constituting the catalyst of the invention is not specifically defined. In case where the component (B) is clay or a clay mineral, the blend ratio of the component (B) in terms of the hydroxyl group therein to mol of the transition metal in the component (A) may fall generally between 0.1 and 100000 mols, but preferably between 0.5 and 10000 mols; that of the component (C) in terms of the silicon atom therein may fall generally between 0.1 and 100000 mols, but preferably between 0.5 and 10000 mols; and that of the organoaluminium compound of the component (D) in terms of the aluminium atom therein may fall generally between 0.1 and 100000 mols, but preferably between 0.5 and 10000 mols. In case where the component (B) is any other than clay or clay minerals, the blend ratio of the component (A) in terms of the transition metal therein to gram of the component (B) preferably falls between 0.00001 and 1 g; and that of the component; (C) in terms of the silicon atom therein preferably falls between 0.001 and 100 g. Also preferably, the blend ratio of the component (E) in terms of the aluminium, magnesium or zinc atom therein falls between 1 and 10000 mols. If the blend ratios of the constituent components oversteps the defined ranges, the polymerization activity of the catalyst will be low.

The mode of preparing the polymerization catalyst is not specifically defined, and various methods are employable for preparing it.

For example, in case where the components (A), (B), (C) and (D) are used for preparing the catalyst, the component (A) and the component (B) are first contacted with each other, and thereafter the component (C) and the component (D) are added thereto; or the component (A) is first contacted with the component (C) and the component (D), and thereafter the component (B) is added thereto; or the component (B) is first contacted with the component (C) and the component (D), and thereafter the component (A) is added thereto; or the four components are contacted with each other all at a time.

Of those, preferred is the method of first contacting the component (B) with the component (C) and the component (D) followed by adding the component (A) thereto.

In case where the component (E) is used for preparing the catalyst, the order of adding the component (E) to the other components is not specifically defined. Irrespective of the presence or absence of the component (D), it is desirable that the constituent components are contacted with each other in any of the four methods mentioned above and thereafter the component (E) is added thereto and contacted with them in a polymerization system. In the invention, while or after the constituent components are contacted with each other, a polymer such as polyethylene, polypropylene or the like, or an inorganic oxide such as silica, alumina or the like may be present in the system or may be contacted with the components.

Contacting the components with each other may be effected in an inert gas such as nitrogen or the like, or in a hydrocarbon such as pentane, hexane, heptane, toluene, xylene or the like. Contacting the components with each other or adding them to the polymerization system may be effected at the polymerization temperature or even at a temperature falling between −30° C. and the boiling point of the solvent used, but preferably between room temperature and the boiling point of the solvent.

[2] Method for Producing Olefin Polymers

In the method for producing polyolefins in the invention, favorably used is the catalyst noted above for homopolymerization of olefins or for copolymerization of olefins with other olefins and/or other monomers (that is, copolymerization of different types of olefins, or copolymerization of olefins with other monomers, or copolymerization of different types of olefins with other monomers).

Olefins to be polymerized in the invention are not specifically defined, but preferred are α-olefins having from 2 to 20 carbon atoms. α-olefins of that type include, for example, ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-hexene, 5-methyl-1-hexene, 3,3-dimethyl-1-pentene, 3,4-dimethyl-1-pentene, 4,4-dimethyl-1-pentene, vinylcyclohexane, etc. Other olefins include dienes such as 1,3-butadiene, 1,4-pentadiene, 1,5-hexadiene, etc.; halogen-substituted α-olefins such as hexafluoropropene, tetrafluoroethylene, 2-fluoropropene, fluoroethylene, 1,1-difluoroethylene, 3-fluoropropene, trifluoroethylene, 3,4-dichloro-1-butene, etc.; cyclic olefins such as cyclopentene, cyclohexene, norbornene, 5-methylnorbornene, 5-ethylnorbornene, 5-propylnorbornene, 5,6-dimethylnorbornene, 5-benzylnorbornene, etc. Styrenic compounds usable herein include, for example, styrene; alkylstyrenes such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene, etc.; alkoxystyrenes such as p-methoxystyrene, o-methoxystyrene, m-methoxystyrene, etc.; halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methylp-fluorostyrene, etc.; and also trimethylsilylstyrene, vinylbenzoates, divinylbenzene, etc. The other olefins to be copolymerized may be suitably selected from the olefins mentioned above.

In the invention, one or more olefins such as those mentioned above may be homopolymerized or copolymerized either singly or as combined. Where two or more different olefins are copolymerized, the olefins mentioned above may be combined in any desired manner.

In the invention, olefins such as those mentioned above may be copolymerized with any other comonomers. The comonomers include, for example, linear diolefins such as butadiene, isoprene, 1,4-pentadiene, 1,5-hexadiene, etc.; polycyclic olefins such as norbornene, 1,4,5,8-dimethano-1,2,3,4,4a,5,8,8a-octahydronaphthalene, 2-norbornene, etc.; cyclic diolefins such as norbornadiene, 5-ethylidenenorbornene, 5-vinylnorbornene, dicyclopentadiene, etc.; and unsaturated esters such as ethyl acrylate, methyl methacrylate, etc.

Of olefins such as those mentioned above, ethylene is especially preferred in the invention. The method for polymerizing olefins is not specifically defined and may be any ordinary one including, for example, slurry polymerization, solution polymerization, vapor-phase polymerization, bulk polymerization, suspension polymerization, etc.

A polymerization solvent may be used in the invention. It includes hydrocarbons and halogenohydrocarbons such as benzene, toluene, xylene, n-hexane, n-heptane, cyclohexane, methylene chloride, chloroform, 1,2-dichloroethane, chlorobenzene, etc. One or more of such solvents are usable either singly or as combined. Depending on their type, monomers to be polymerized may also serve as solvents.

In view of the catalytic activity for polymerization and of the reactor efficiency, it is desirable that the amount of the catalyst to be in the polymerization system is so controlled that the amount of the component (A) could fall generally between 0.5 and 100 $\mu$mols, but preferably between 2 and 25 $\mu$mols, in one liter of the solvent in the system.

Regarding the polymerization condition, the pressure may fall generally between ordinary pressure and 2000 kg/cm$^2$G. The reaction temperature may fall generally between −50 and 250° C. For controlling the molecular weight of the polymers to be produced, the type and the amount of the catalytic components to be used and the polymerization temperature will be suitably selected. If desired, hydrogen may be introduced into the polymerization system for that purpose.

The invention is described in more detail with reference to the following Examples, which, however, are not intended to restrict the scope of the invention.

EXAMPLE I-1
(1) Chemical Treatment of Clay Mineral 40 g of a commercial product of montmorillonite (Kunipia F from Kunimine Industry) was ground in a grinder for 4 hours. 20 g of the powdered montmorillonite was put into a four-necked flask having a capacity of 500 ml, and dispersed in 100 ml of deionized water containing 20 g of magnesium chloride 6-hydrate dissolved therein. This was stirred at 90° C. for 0.5 hours. After having been thus processed, the solid residue was washed with water. This treatment was repeated once again. Thus was obtained magnesium chloride-processed montmorillonite. This was dried, then dispersed in 160 ml of an aqueous solution of 6% HCl, and stirred under reflux for 2 hours. After having been thus processed, this was washed with water through repeated filtration until the filtration wash became neutral, and then dried. The product thus obtained is chemical-treated montmorillonite.

(2) Contact Treatment with Silane Compound and Organoaluminium 1.0 g of the chemical-treated montmorillonite obtained in (1) (this had a water content of 15% by weight—the water content is derived from the weight loss obtained by dewatering its sample under heat at 150° C. for 1 hour, and the same shall apply hereunder) was put into a 300 ml Schlenk tube, to which was added 25 ml of toluene. These were dispersed to prepare a slurry. To this was added 1.13 g (5.2 mmols) of phenethylmethylsilyl dichloride, and stirred at room temperature for 60 hours and then under heat at 100° C. for 1 hour. This was cooled to room temperature, the resulting supernatant was removed, and the solid residue was washed with 200 ml of toluene. Next, 12.5 mmols of triisobutylaluminium was added thereto, and then stirred at room temperature for 30 minutes. Stirring it was stopped, and the solid residue was washed with 200 ml of toluene. Toluene was added to the resulting slurry to make a total volume of 50 ml. The clay mineral solution thus obtained was analyzed through IPC, through which the triisobutylaluminium-derived Al content of the clay mineral was found to be 1.4 mmols (of Al atom)/g.

(3) Polymerization of Ethylene

An autoclave having a capacity of 1.6 liters was fully dried and then purged with nitrogen. 400 ml of toluene having been dewatered at room temperature, 25 $\mu$mols of trimethylaluminium, 5 ml of the clay mineral solution having been prepared in (2) (corresponding to 0.1 g of the clay mineral, and having an Al content of 0.14 mmols), and 5 $\mu$mols of the iron complex [3] mentioned above (this is a transition metal compound having a nitrogen-containing tridentate ligand) were put into the autoclave in that order. Ethylene was continuously introduced into the autoclave at 25° C. to have a pressure of 8 kg/cm$^2$G therein, and polymerized for 30 minutes. Next, methanol was added to this to stop the polymerization. The polymer thus produced was taken out through filtration, and dried at 90° C. under reduced pressure for 12 hours. The polymer thus obtained weighed 73.8 g. The polymerization activity of the catalyst used herein was 503 kg/g-Fe·hr.

The polymer had an intrinsic viscosity [η] of 3.94 dl/g measured in decalin at 135° C., and had a density of 0.9332 g/cm$^3$.

EXAMPLE I-2
(1) Chemical Treatment of Clay Mineral

This is the same as in (1) in Example I-1.

(2) Contact Treatment with Silane Compound and Organoaluminium

This is the same as in (2) in Example I-1.

(3) Polymerization of Ethylene

This is the same as in Example I-1, except that triisobutylaluminium and not trimethylaluminium was used herein. The polymer obtained weighed 68.1 g. (The polymerization activity of the catalyst used was 464 kg/g-Fe·hr.)

The polymer had an intrinsic viscosity [η] of 8.95 dl/g measured in decalin at 135° C., and had a density of 0.9361 g/cm$^3$.

EXAMPLE I-3
(1) Chemical Treatment of Clay Mineral

This is the same as in (1) in Example I-1.

(2) Contact Treatment with Silane Compound and Organoaluminium

This is the same as in (2) in Example I-1.

(3) Polymerization of Ethylene

This is the same as in Example I-1. In this, however, the iron complex [4] mentioned above and not [3] was used and trimethylaluminium was not used. The polymer obtained weighed 70.2 g. (the polymerization activity of the catalyst used was 478 kg/g-Fe·hr.)

The polymer had an intrinsic viscosity [η] of 3.86 dl/g measured in decalin at 135° C., and had a density of 0.9342 g/cm³.

EXAMPLE I-4

(1) Chemical Treatment of Clay Mineral

This is the same as in (1) in Example I-1.

(2) Contact Treatment with Silane Compound

This is the same as in (2) in Example I-1. In this, however, the clay mineral was not processed with triisobutylaluminium.

(3) Polymerization of Ethylene

An autoclave having a capacity of 1.6 liters was fully dried and then purged with nitrogen. 400 ml of toluene having been dewatered at room temperature, 25 μmols of trimethylaluminium, 5 ml of the clay mineral solution having been prepared in (2) (corresponding to 0.1 g of the clay mineral), and 5 μmols of the iron complex [3] mentioned above (this is a transition metal compound having a nitrogen-containing tridentate ligand) were put into the autoclave in that order. Ethylene was continuously introduced into the autoclave at 25° C. to have a pressure of 8 kg/cm²G therein, and polymerized for 30 minutes. Next, methanol was added to this to stop the polymerization. The polymer thus produced was taken out through filtration, and dried at 90° C. under reduced pressure for 12 hours. The polymer thus obtained weighed 62.5 g. The polymerization activity of the catalyst used herein was 426 kg/g-Fe·hr.

The polymer had an intrinsic viscosity [η] of 4.53 dl/g measured in decalin at 135° C., and had a density of 0.9368 g/cm³.

EXAMPLE I-5

(1) Chemical Treatment of Clay Mineral

This is the same as in (1) in Example I-1.

(2) Contact Treatment with Silane Compound

This is the same as in (2) in Example I-4.

(3) Polymerization of Ethylene

This is the same as in Example I-4, except that triisobutylaluminium and not trimethylaluminium was used herein. The polymer obtained weighed 65.8 g. (The polymerization activity of the catalyst used was 448 kg/g-Fe·hr.)

The polymer had an intrinsic viscosity [η] of 8.87 dl/g measured in decalin at 135° C., and had a density of 0.9335 g/cm³

Comparative Example I-1

The same process as in Example I-1 was repeated, except that 1 mmol of methylaluminoxane and not the clay mineral solution prepared in (2) in Example I-1 was used as a promoter. The polymer obtained weighed 54.1 g. (The polymerization activity of the catalyst used was 369 kg/g-Fe·hr.)

The polymer had an intrinsic viscosity [η] of 3.6 dl/g, and a density of 0.9303 g/cm³.

Comparative EXAMPLE I-2

The same process as in Example I-1 was repeated, except that 165 μmols of methylaluminoxane and not the clay mineral solution prepared in (2) in Example I-1 was used as a promoter. The polymer obtained weighed 20.2 g. (The polymerization activity of the catalyst used was 173 kg/g-Fe·hr.)

The polymer had an intrinsic viscosity [η] of 1.23 dl/g, and a density of 0.9324 g/cm³.

Second Aspect of the Invention

As so mentioned above, the catalyst for olefin polymerization of the second aspect of the invention (in this section, the second aspect of the invention will be simply referred to as "the invention") comprises (A) a transition metal compound which has a nitrogen-containing tridentate ligand and of which the transition metal is of Groups 8 to 10 of the Periodic Table, (B) clay, a clay mineral or an ion-exchanging layered compound and (C) an organosilane compound. In the method for producing olefin polymers of the invention, the olefin polymerization catalyst is used for polymerizing olefins.

The catalyst for olefin polymerization and the method for producing olefin polymers of the invention are described in detail hereinunder.

[1] Catalyst for Olefin Polymerization (1) Transition Metal Compound (A)

The transition metal compound (A) for use in the invention, which has a nitrogen-containing tridentate ligand and of which the transition metal is of Groups 8 to 10 of the Periodic Table, is not specifically defined, but is preferably represented by the following general formula (II-I):

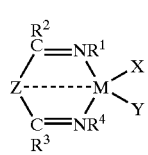

(II-I)

wherein M represents a transition metal of Groups 8 to 10 of the Periodic Table; $R^1$, $R^2$, $R^3$ and $R^4$ each independently represent a hydrogen atom, a hydrocarbon group having from 1 to 20 carbon atoms, or a cycloaromatic hydrocarbon group having from 7 to 20 carbon atoms in total; X and Y each independently represent a hydrogen atom, or a hydrocarbon group having from 1 to 20 carbon atoms; Z represents a nitrogen-containing functional group.

M represents a transition metal of Groups 8 to 10 of the Periodic Table, concretely including Fe, Co, Ni, Ru, Rh, Pd, Os, Ir and Pt. Of these, preferred is Fe or Co.

$R^1$, $R^2$, $R^3$ and $R^4$ each independently represent a hydrogen atom, a hydrocarbon group having from 1 to 20 carbon atoms, or a cycloaromatic hydrocarbon group having from 7 to 20 carbon atoms in total. The hydrocarbon group having from 1 to 20 carbon atoms includes a linear hydrocarbon group having from 1 to 20 carbon atoms, a branched hydrocarbon group having from 3 to 20 carbon atoms, and a cycloaliphatic hydrocarbon group having from 3 to 20 carbon atoms. Concretely, it includes a methyl group, an ethyl group, an n-propyl group, an isopropyl group, an n-butyl group, an isobutyl group, a sec-butyl group, a t-butyl group, a pentyl group, a hexyl group, an octyl group, a decyl group, a tetradecyl group, a hexadecyl group, an octadecyl group, a cyclopentyl group, a cyclohexyl group, a cyclooctyl group, etc.

X and Y each indicate a hydrogen atom, or a hydrocarbon group having from 1 to 20 carbon atoms. The hydrocarbon group having from 1 to 20 carbon atoms may be the same as that mentioned hereinabove. For this, preferred is a methyl group. X and Y may be the same or different.

Z is a nitrogen-containing functional group. Preferably, it is represented by the following general formula (II-II):

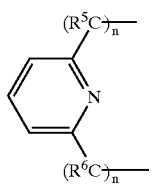
(II-II)

wherein $R^5$ and $R^6$ each independently represent an aliphatic hydrocarbon group having from 1 to 20 carbon atoms, or a cycloaromatic hydrocarbon group having from 7 to 20 carbon atoms in total; n represents 0 or a natural number.

The aliphatic hydrocarbon group having from 1 to 20 carbon atoms and the cycloaromatic hydrocarbon group having from 7 to 20 carbon atoms in total for $R^5$ and $R^6$ may be the same as the hydrocarbon group having from 1 to 20 carbon atoms and the cycloaromatic hydrocarbon group having from 7 to 20 carbon atoms in total mentioned hereinabove for $R^1$, $R^2$, $R^3$ and $R^4$. n indicates 0 or a natural number, but is preferably any of 0, 1, 2 or 3.

Specific examples of the nitrogen-containing functional groups of formula (II-II) are

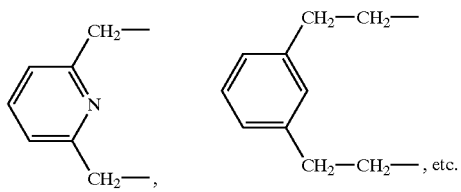

For Z, also preferred is a nitrogen-containing functional group of the following general formula (II-III):

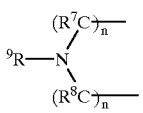
(I-III)

wherein $R^7$, $R^8$ and $R^9$ each independently represent an aliphatic hydrocarbon group having from 1 to 20 carbon atoms, or a cycloaromatic hydrocarbon group having from 7 to 20 carbon atoms in total, and these may be bonded to each other to form a ring; n represents 0 or a natural number.

The aliphatic hydrocarbon group having from 1 to 20 carbon atoms and the cycloaromatic hydrocarbon group having from 7 to 20 carbon atoms in total for $R^7$, $R^8$ and $R^9$ may be the same as the hydrocarbon group having from 1 to 20 carbon atoms and the cycloaromatic hydrocarbon group having from 7 to 20 carbon atoms in total mentioned hereinabove for $R^1$, $R^2$, $R^3$ and $R^4$. n indicates 0 or a natural number, but is preferably any of 0, 1, 2 or 3.

$R^7$, $R^8$ and $R^9$ may be bonded to each other to form a ring.

Specific examples of the nitrogen-containing functional groups of formula (II-III) are

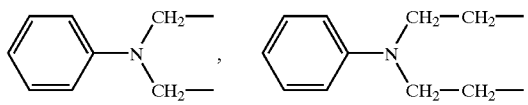

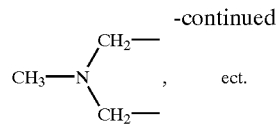

For Z, especially preferred is the nitrogen-containing functional group of formula (II-II) having a pyridine skeleton.

One preferred embodiment of the transition metal compound of formula (II-I) is represented by the following general formula:

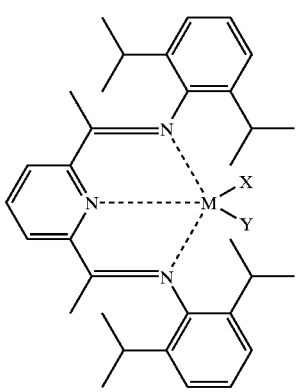
(II-IV)

wherein M represents Fe or Co; X and Y each independently represent a hydrogen atom, or a hydrocarbon group having from 1 to 20 carbon atoms.

Specific examples of the transition metal compound of that type are the following compounds [3] to [11].

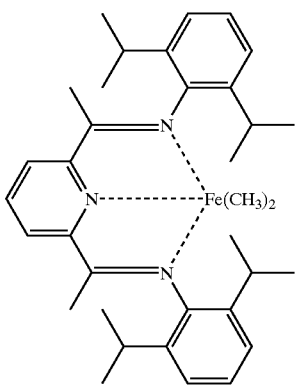
[3]

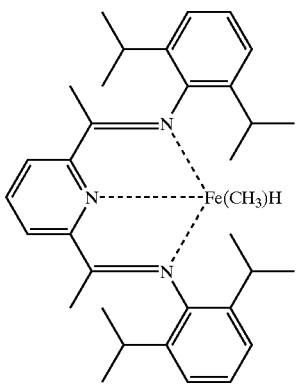
[4]

[5] 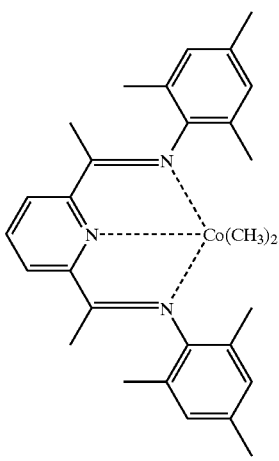

[6]

[7]

[8] 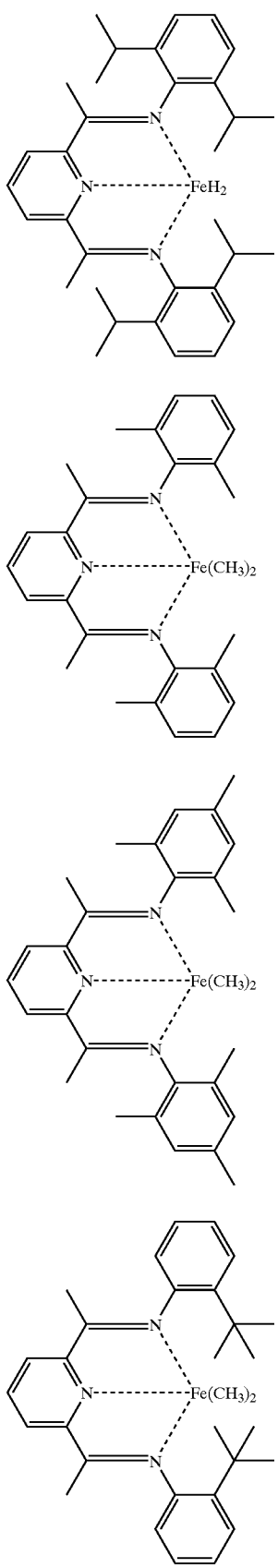

[9] 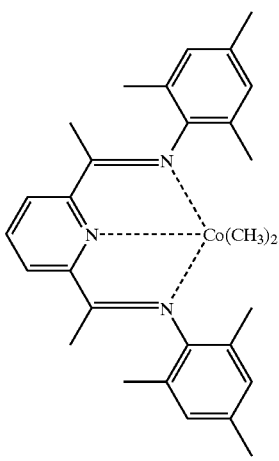

[10] 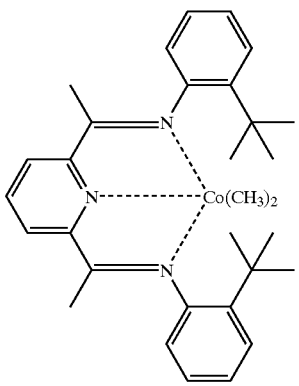

[11] 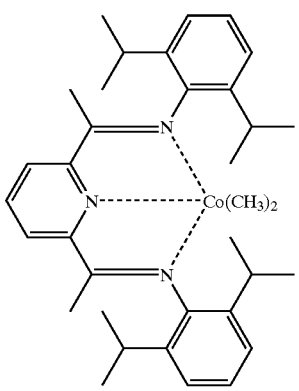

In the invention, one or more of the transition metal compounds mentioned above may be used, either singly or as combined,: for the component (A).

(B) Component (B)

For the component (B), used is any of clay, clay minerals or ion-exchanging layered compounds. For their details and examples, referred to is the description relating to them in the section of the first aspect of the invention mentioned above. All those mentioned in the first section shall apply also to this section.

(C) Organosilane Compound

In the invention, used is an organosilane compound for the component (C). For its details and examples, referred to is the description relating to it in the section of the first aspect of the invention mentioned above. All those mentioned in the first section shall apply also to this section.

(D) Organoaluminium Compound

In the invention, optionally used is the organoaluminium compound (D). For its details and examples, referred to is the description relating to it in the section of the first aspect of the invention mentioned above. All those mentioned in the first section shall apply also to this section. In view of its polymerization activity, the catalyst preferably contains the component (D).

The ratio of the components constituting the catalyst of the invention is not specifically defined. In case where the component (B) is clay or a clay mineral, the blend ratio of the component (B) in terms of the hydroxyl group therein to mol of the transition metal in the component (A) may fall generally between 0.1 and 100000 mols, but preferably between 0.5 and 10000 mols; that of the component (C) in terms of the silicon atom therein may fall generally between 0.1 and 100000 mols, but preferably between 0.5 and 10000 mols; and that of the organoaluminium compound of the component (D) in terms of the aluminium atom therein may fall generally between 0.1 and 100000 mols, but preferably between 0.5 and 10000 mols. In case where the component (B) is any other than clay or clay minerals, the blend ratio of the component (A) in terms of the transition metal therein to gram of the component (B) preferably falls between 0.00001 and 1 g; and that of the component (C) in terms of the silicon atom therein preferably falls between 0.001 and 100 g. Also preferably, the blend ratio of the component (D) in terms of the aluminium atom therein falls between 1 and 10000 mols.

The mode of preparing the polymerization catalyst is not specifically defined, and various methods are employable for preparing it.

For example, the component (A) and the component (B) are first contacted with each other, and thereafter the component (C) is added thereto; or the component (A) is first contacted with the component (C), and thereafter the component (B) is added thereto; or the component (B) is first contacted with the component (C), and thereafter the component (A) is added thereto; or the three components are contacted with each other all at a time. Of those, preferred is the method of first contacting the component (B) with the component (C) followed by adding the component (A) thereto.

In case where the component (D) is used for preparing the catalyst, it may be contacted with the other components in any desired order with no limitation in the four methods mentioned above. It may be present in the system in the first stage of reaction, or may be added to the system after the other components have been contacted with each other.

In the invention, while or after the catalytic components are contacted with each other, a polymer such as polyethylene, polypropylene or the like, or a solid inorganic oxide such as silica, alumina or the like may be present in the system or may be contacted with the components. Contacting the components with each other may be effected in an inert gas such as nitrogen or the like, or in a hydrocarbon such as pentane, hexane, heptane, toluene, xylene or the like. Contacting the components with each other or adding them to the polymerization system may be effected at the polymerization temperature or even at a temperature falling between −30° C. and the boiling point of the solvent used, but preferably between room temperature and the boiling point of the solvent.

[2] Method for Producing Olefin Polymers

The method for producing olefin polymers of the invention is characterized by homopolymerizing or copolymerizing olefins in the presence of the catalyst that comprises the component (A), a transition metal compound, the component (B), any of clay, clay minerals or ion-exchanging layered compound, and the component (C), an organosilane compound.

In the method for producing polyolefins in the invention, favorably used is the catalyst noted above for homopolymerization of olefins or for copolymerization of olefins with other olefins and/or other monomers (that is, copolymerization of different types of olefins, or copolymerization of olefins with other monomers, or copolymerization of different types of olefins with other monomers).

Olefins to be polymerized in the invention are not specifically defined. For their examples, referred to is the description relating to them in the first aspect of the invention mentioned above. All those mentioned in the first section shall apply also to this section.

In the invention, one or more olefins such as those mentioned above may be homopolymerized or copolymerized either singly or as combined. Where two or more different olefins are copolymerized, the olefins mentioned above may be combined in any desired manner.

In the invention, olefins such as those mentioned above may be copolymerized with any other comonomers. For the comonomers, all those concretely mentioned in the first aspect of the invention shall apply also to this section.

Of olefins such as those mentioned above, ethylene is especially preferred in the invention. The method for polymerizing olefins is not specifically defined and may be any ordinary one including, for example, slurry polymerization, solution polymerization, vapor-phase polymerization, bulk polymerization, suspension polymerization, etc.

A polymerization solvent may be used in the invention. It includes hydrocarbons and halogenohydrocarbons such as benzene, toluene, xylene, n-hexane, n-heptane, cyclohexane, methylene chloride, chloroform, 1,2-dichloroethane, chlorobenzene, etc. One or more of such solvents are usable either singly or as combined. Depending on their type, monomers to be polymerized may also serve as solvents.

In view of the catalytic activity for polymerization and of the reactor efficiency, it is desirable that the amount of the catalyst to be in the polymerization system is so controlled that the amount of the component (A) could fall generally between 0.5 and 100 $\mu$mols, but preferably between 2 and 25 $\mu$mols, in one liter of the solvent in the system.

Regarding the polymerization condition, the pressure may fall generally between ordinary pressure and 2000 kg/cm$^2$G. The reaction temperature may fall generally between −50 and 250° C. For controlling the molecular weight of the polymers to be produced, the type and the amount of the catalytic components to be used and the polymerization temperature will be suitably selected. If desired, hydrogen may be introduced into the polymerization system for that purpose.

The invention is described in more detail with reference to the following Examples, which, however, are not intended to restrict the scope of the invention.

EXAMPLE II-1

(1) Chemical Treatment of Clay Mineral 40 g of a commercial product of montmorillonite (Kunipia F from Kunimine Industry) was ground in a grinder for 4 hours. 20 g of the powdered montmorillonite was put into a four-necked flask having a capacity of 500 ml, and dispersed in 100 ml of deionized water containing 20 g of magnesium chloride 6-hydrate dissolved therein. This was stirred at 90° C. for 0.5 hours. After having been thus processed, the solid residue was washed with water. This treatment was repeated once again. Thus was obtained magnesium chloride-processed montmorillonite. This was dried, then dispersed in 160 ml of an aqueous solution of 6% HCl, and stirred under reflux for 2 hours. After having been thus processed, this was washed with water through repeated filtration until the filtration wash became neutral, and then dried. The product thus obtained is chemical-treated montmorillonite.

(2) Contact Treatment of Clay Mineral with Organosilane Compound 1.0 g of the chemical-treated montmorillonite obtained in (1) (this had a water content of 15% by weight—the water content is derived from the weight loss obtained by dewatering its sample-under heat at 150° C. for 1 hour) was put into a 300 ml Schlenk tube, to which was added 25 ml of toluene. These were dispersed to prepare a slurry. To this was added 1.13 g (5.2 mmols) of phenethylmethylsilyl dichloride, and stirred at room temperature for 60 hours and then under heat at 100° C. for 1 hour. This was cooled to room temperature, the resulting supernatant was removed, and the solid residue was washed with 200 ml of toluene. Toluene was added to the resulting slurry to make a total volume of 50 ml. Thus was obtained a solution of the clay mineral.

(3) Polymerization of Ethylene

An autoclave having a capacity of 1.6 liters was fully dried and then purged with nitrogen. 400 ml of toluene having been dewatered at room temperature, 5 ml of the clay mineral solution having been prepared in (2) (corresponding to 0.1 g of the clay mineral), and 5 μmols of the compound [3] mentioned above (this is a compound of a transition metal of Groups 8 to 10 of the Periodic Table, having a nitrogen-containing tridentate ligand) were put into the autoclave in that order. Ethylene was continuously introduced into the autoclave at 25° C. to have a pressure of 8 kg/cm²G therein, and polymerized for 30 minutes. Next, methanol was added to this to stop the polymerization. The polymer thus produced was taken out through filtration, and dried at 90° C. under reduced pressure for 12 hours. The polymer thus obtained weighed 62.2 g. The polymerization activity of the catalyst used herein was 423 kg/g-Fe·hr.

The polymer had an intrinsic viscosity [η] of 4.2 dl/g measured in decalin at 135° C., and had a density of 0.9351 g/cm³. This was granular, having a bulk density of 0.35 g/cm³. The reactor used for polymerization was checked, and no deposit adhered to its wall.

Comparative Example II-1

The same process as in Example II-1 was repeated, except that 1 mmol of methylaluminoxane and not the clay mineral solution prepared in (2) was used as a promoter. The polymer obtained weighed 54.1 g. (The polymerization activity of the catalyst used was 369 kg/g-Fe·hr.)

The polymer had an intrinsic viscosity [η] of 3.6 dl/g, and a density of 0.9303 g/cm³. This was bulky and amorphous. The reactor used for polymerization was checked, and some deposit adhered to its wall.

From the above, it is understood that the polymerization activity of the catalyst of the invention, though not containing an expensive aluminoxane or organoaluminium but containing a clay mineral, is comparable to or higher than that of conventional catalysts. In addition, it is understood that, in the method where the catalyst of the invention is used, no deposit adheres to the reactor wall and the polymer produced has good powder morphology.

Industrial Applicability

Comprising a transition metal compound which has a nitrogen-containing tridentate ligand and of which the transition metal is of Groups 8 to 10 of the Periodic Table, any of clay, a clay mineral or an ion-exchanging layered compound, and an organosilane compound, and optionally containing, an organoaluminium compound and others, the catalyst of the invention has high activity. In the method of using the catalyst for producing polyolefins, no deposit adheres to the reactor wall and the polyolefins produced have good powder morphology. The invention realizes efficient production of polyolefins (especially polyethylene) on an industrial scale.

What is claimed is:

1. A catalyst for olefin polymerization, comprising:
(A) a transition metal compound of the following formula (I-I), which has a nitrogen-containing tridentate ligand and of which the transition metal is of Groups 8 to 10 of the agent:

wherein M represents a transition metal of Groups 8 to 10 of the Periodic Table; $R^1$, $R^2$, $R^3$ and $R^4$ each independently represent hydrogen, a hydrocarbon group having from 1 to 20 carbon atoms, or an aromatic hydrocarbon group having from 7 to 20 carbon atoms; X represents a halogen atom; Y represents hydrogen, or a hydrocarbon group having from 1 to 20 carbon atoms; and Z represents a nitrogen-containing functional group.

2. The catalyst for olefin polymerization as claimed in claim 1, in which X in formula (I-I) is represented by the following formula (I-II):

wherein $R^5$ and $R^6$ each independently represent an aliphatic hydrocarbon group having from 1 to 20 carbon atoms, or an aromatic hydrocarbon group having from 7 to 20 carbon atoms; and n represents 0 or a natural number.

3. The catalyst for olefin polymerization as claimed in claim 1, in which Z in formula (I-I) is represented by the following formula (I-III):

wherein $R^7$, $R^8$ and $R^9$ each independently represent an aliphatic hydrocarbon group having from 1 to 20 carbon atoms, or an aromatic hydrocarbon group having from 7 to 20 carbon atoms, and these may be bonded to each other to form a ring; and n represents 0 or a natural number.

4. The catalyst for olefin polymerization as claimed in claim 1, in which the transition metal of Groups 8 to 10 of the Periodic Table is iron or cobalt.

5. The catalyst for olefin polymerization as claimed in any of claims 1 to 4, in which (C) is an organosilane compound having at least one alkyl group directly bonded to the silicon atom.

6. The catalyst for olefin polymerization as claimed in claim 1, in which the alkylating agent is a trialkylaluminium compound.

7. A catalyst for olefin polymerization, comprising (A) a transition metal compound which has a nitrogen-containing tridentate ligand and of which the transition metal is of Groups 8 to 10 of the Periodic Table, (B) clay, a clay mineral or an ion-exchanging layered compound and (C) an organosilane compound.

8. The catalyst for olefin polymerization as claimed in claim 7, in which the transition metal compound (A) is represented by the following formula (II-I)

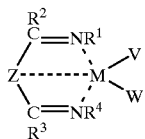

(II-I)

wherein M represents a transition metal of Groups 8 to 10 of the Periodic Table; $R^1$, $R^2$, $R^3$ and $R^4$ each independently represent hydrogen, a hydrocarbon group having from 1 to 20 carbon atoms, or an aromatic hydrocarbon group having from 7 to 20 carbon atoms; V and W each independently represent hydrogen, or a hydrocarbon group having from 1 to 20 carbon atoms; and Z represents a nitrogen-containing functional group.

9. The catalyst for olefin polymerization as claimed in claim 8, in which Z in formula (II-I) is represented by the following formula (II-II):

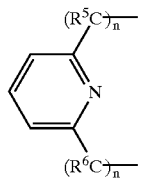

(II-II)

wherein $R^5$ and $R^6$ each independently represent an aliphatic hydrocarbon group having from 1 to 20 carbon atoms, or an aromatic hydrocarbon group having from 7 to 20 carbon atoms; and n represents 0 or a natural number.

10. The catalyst for olefin polymerization as claimed in claim 8, in which Z in formula (II-I) is represented by the following formula (II-III):

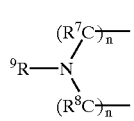

(II-III)

wherein $R^7$, $R^8$ and $R^9$ each independently represent an aliphatic hydrocarbon group having from 1 to 20 carbon atoms, or an aromatic hydrocarbon group having from 7 to 20 carbon atoms, and these may be bonded to each other to form a ring; and n represents 0 or a natural number.

11. The catalyst for olefin polymerization as claimed in any of claims 7 to 10, in which the transition metal of Groups 8 to 10 of the Periodic Table is iron or cobalt.

12. The catalyst for olefin polymerization as claimed in any of claims 1 to 11, in which (B) is a phyllosilicate.

13. The catalyst for olefin polymerization as claimed in any of claims 1 to 11, in which (B) is montmorillonite.

14. A method for producing olefin polymers, which comprises polymerizing olefins in the presence of the catalyst for olefin polymerization of any of claims 1 to 13.

15. The method for producing olefin polymers as claimed in claim 14, in which the olefin is ethylene.

* * * * *